April 18, 1950 R. LEE 2,504,849

SAW-TOOTH WAVE GENERATOR

Original Filed Sept. 12, 1946

WITNESSES:

Robert A. Baird

Wm. C. Groome

INVENTOR

Reuben Lee.

BY F. W. Lyle.

ATTORNEY

UNITED STATES PATENT OFFICE 2,504,849

SAW-TOOTH WAVE GENERATOR

Reuben Lee, Linthicum Heights, Md., assignor to Westinghouse Electric Corporation, East Pittsburgh, Pa., a corporation of Pennsylvania Original application September 12, 1946, Serial No. 696,574. Divided and this application July 22, 1948, Serial No. 40,119

4 Claims. (Cl. 250—36)

My invention relates to oscillation generators and, in particular, to a new type of oscillation generator particularly adapted to the production of sawtooth wave forms.

This application is a division of my Patent 2,456,961, filed September 12, 1946, for a Sawtooth wave generator, and assigned to the assignee of the application.

One object of my invention is to produce a generator for sharply peaked waves which shall be of a high degree of stability in respect to frequency and amplitude.

Another object of my invention is to provide a generator of waves of the general sawtooth form which shall involve only relatively simple circuit elements.

Another object of my invention is to provide a generator for sawtooth waves in which the wave-slope is to a high degree rectilinear.

Still another object of my invention is to provide an arrangement for generating sawtooth waves which shall employ only alternating-current generators of substantially pure sine waves in combination with a circuit involving rectifiers.

A further object of my invention is to provide a sawtooth wave generator the output of which shall have a wave form of substantially linear negative slope.

Other objects of my invention will become apparent upon reading the following description taken in connection with the accompanying drawing, in which.

Figure 1:
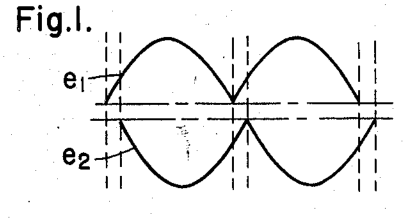
Figures 1, 2, 6 and 7 are graphs showing the wave form produced by certain circuits embodying the principles of my invention.

Referring in detail to the drawing, the curve marked $e_1$ in Fig. 1 shows a plot in which the abscissae represent time and the ordinates amplitude of the output voltage of an ideal full wave rectifier when the input voltage thereto is an ideal pure sine wave. In order to obtain an output voltage of the form $e_1$, it is necessary that the circuits of the rectifier shall have the least practicable leakage inductance and stray capacitance.

The curve $e_2$ in Fig. 1 is simply the reverse of the curve $e_1$ displaced slightly in phase relative thereto; in other words, it illustrates the wave form of the output of a similar full-wave rectifier so connected as to produce current of the opposite polarity to the rectifier producing the curve $e_1$, and supplied from a sine wave alternator which lags slightly in phase relative to that supplying the rectifier of output $e_1$.

Figure 2:
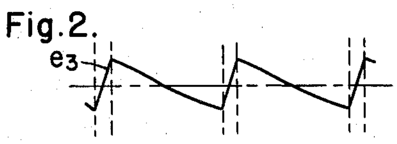

When the ordinates of the curves $e_1$ and $e_2$ of Fig. 1 are added together, a curve of the wave form $e_3$ shown in Fig. 2 results. It will be noted that in Fig. 2 the downward slope of the curve is not exactly rectilinear, but that the curve gives a fair approximation to a sawtooth wave. Varying the phase displacement between the curves $e_1$ and $e_2$ will change the amount of the departure of the down slope from rectilinearity and will also change the amplitude of the peaks and troughs of the wave, and the ratio of up-slope to down-slope. However, the curve $e_3$ in Fig. 2 probably represents about the best approximation to a rectilinear down-slope that can be obtained, with the phase displacement between curves $e_1$ and $e_2$ such as to give steep up-slope.

Figure 3:
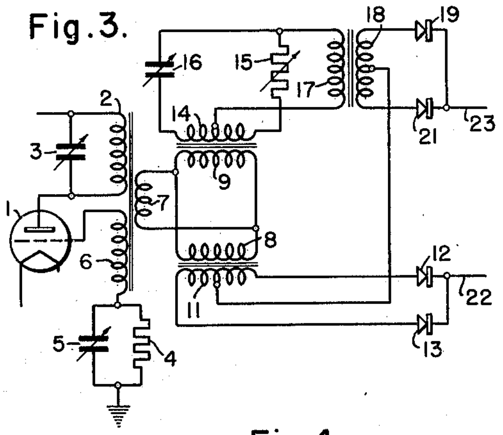
Fig. 3 is a circuit diagram of an embodiment of my invention.

A circuit network capable of producing voltage of the wave form $e_3$ is shown in Fig. 3 where an ordinary high vacuum triode 1 has its plate circuit provided with an antiresonant tuned network comprising an inductance 2 and a capacitance 3 and likewise has its grid circuit provided with a self-bias circuit comprising a resistance 4 and a capacitance 5. In a manner well known in the electronics art, the grid circuit and the plate circuit of the tube 1 are magnetically interlinked, for example by locating the inductance 2 and an inductance 6 in the grid circuit in mutually inductive relation to each other. The circuit 1 to 6 will be recognized as an ordinary feed-back oscillator, and such oscillators can be made by well known methods of adjustment to produce output voltages which approximate very closely to the sine wave form. This particular type of oscillator is to be taken merely as symbolical of any suitable sine wave generator known in the art.

An output coil 7, inductively linked with the load circuit of the oscillator 1, is connected to two transformer primaries 8, 9. A secondary 11 associated with the primary winding 8 has its end terminals connected through a pair of rectifiers 12, 13 which may, for example, be high-vacuum diodes, or, alternatively, be copper oxide rectifiers or any other suitable type of rectifier. The primary winding 9 is associated with a secondary winding 14 across the terminals of which are serially connected a variable resistor 15 and a capacitor 16. The common terminal of the resistor 15 and the capacitor 16 is connected to one terminal of a primary winding 17, the other terminal of which is connected to the midpoint of the winding 14. A secondary winding 18, associated with the primary winding 17, has its end terminals connected to a pair of rectifiers 19, 21 which may be of the same general type as the rectifiers 12, 13 already mentioned. The midpoint of the secondary winding 11 is connected to the midpoint of the secondary winding 18, and the common terminals of the rectifiers 12, 13 are connected to one side 22 of an output circuit in which it is desired to use a wave form of the type shown in Fig. 2, the other terminal of this output circuit being connected to a line 23 connected to the common terminal of the rectifiers 19, 21.

It will be recognized that the resistor 15 and the capacitor 16 constitute a phase-displacing circuit by which the alternating voltage impressed on the primary winding 17 may be displaced to any desired degree relative to the alternating voltage impressed on the primary winding 8. By properly designing, in ways which will be evident to those skilled in the art, the size of the transformer windings above mentioned or, alternatively, by properly adjusting the resistor 15 and capacitor 16, the relative amplitudes and phase of the rectified voltage waves produced respectively by the rectifiers 12, 13 and 19, 21 may be adjusted at will. A moment's consideration of the above-described circuit will show that the rectifiers 12, 13 will produce an output voltage similar to $e_1$ in Fig. 1, while the rectifiers 19, 21 will produce a rectified voltage of opposite polarity displaced in phase relative to the output of rectifiers 12, 13, and hence a voltage similar to $e_2$ in Fig. 1 across the terminals of the rectifiers 19, 21. A voltage will be produced across the line wires 22, 23, which will have the wave form shown in the curve $e_3$ in Fig. 2.

Figure 4:
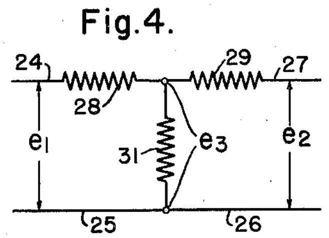
Figs. 4, 5 and 8 are diagrams of certain circuit networks which may be employed in carrying out the principles of my invention.

In Fig. 4, I show an alternative form of network which may be connected to the output of rectifiers 12, 13 and 19, 21 in Fig. 3 to produce a wave form of the type shown in Fig. 2. When the arrangement shown in Fig. 4 is to be used, the line wire connecting the midpoints of secondary windings 11 and 18 is broken. A moment's consideration will show that between the midpoint of the secondary winding 11 and the common terminal 22 of rectifiers 12, 13 is produced a voltage of the form $e_1$ in Fig. 1, while a voltage of the wave form $e_2$ in Fig. 1 is produced between the output terminal 23 and the midpoint of the winding 18 in Fig. 3. The terminal 22 and the line leading to the midpoint of winding 11 in Fig. 3 are then connected between the terminals 24, 25 in the network shown in Fig. 4, while the terminal 23 and the midpoint of the secondary winding 18 in Fig. 3 are connected, respectively, to the terminals 26 and 27 in Fig. 4. Between the terminals 24 and 27 in Fig. 4 are serially connected a pair of impedances 28, 29 which may be resistors, while a third impedance 31, which may likewise be a resistor, is connected between the midpoints of the impedances 28, 29 and the line interconnecting terminals 25 and 26 in Fig. 4. A moment's consideration will show that the voltage across the terminals of the impedance 31 will be the algebraic difference of the voltages $e_1$ and $e_2$ of Fig. 1; in other words, the voltage across the impedance 31 will have the wave form $e_3$ shown in Fig. 2.

Figure 6:
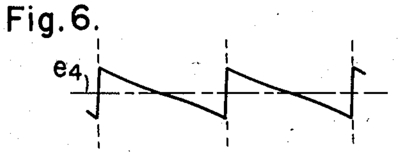
Figure 5:
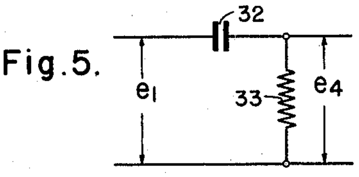

If a voltage of the wave form $e_1$ of Fig. 1 is connected across a capacitance 32 in series with a resistance 33, as shown in Fig. 5, the wave form across the resistance 33 will be of the type shown in Fig. 6. It will be noted that the downward slope of the waves shown in Fig. 6 is not rectilinear but is curved in a sense opposite to the curvature of the down slope of voltage $e_3$ in Fig. 2. The degree of departure of the down slopes in Fig. 6 from rectilinearity is a function of the relative magnitudes of the capacitor 32 and the resistor 33 in Fig. 5.

Since the curvature of the down slope in Fig. 6 is the reverse of the curvature in the down slope of the voltage $e_3$ in Fig. 2, it will be evident that by properly proportioning the size of the capacitor 32 and the resistor 33 in Fig. 5, it will be possible to cause the curvature in the down slope of the curve $e_4$ of Fig. 6 to exactly compensate for the reverse curvature in the down slope of the curve $e_3$ in Fig. 2 if the voltages $e_3$ and $e_4$ are added together in a circuit. When this is done, a curve of the form $e_5$ shown in Fig. 7 in which both the up-slope and down-slope of the wave are almost exactly rectilinear will be obtained.

Figure 7:
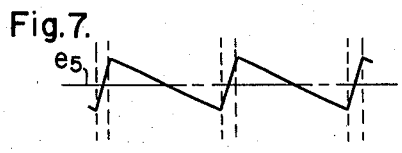
Figure 8:
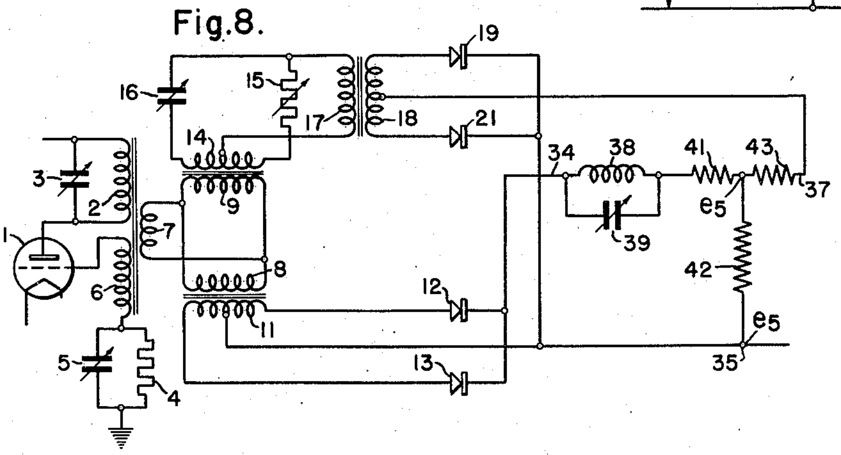

Fig. 8 shows a network in which the voltage of the wave form $e_3$ and $e_4$ are properly added together to obtain a wave form of the type shown in Fig. 7. In this case one branch includes a parallel network comprising an inductance 38 and a condenser 39 connected in series with resistor 41, a second branch consists of the resistor 42 and the third branch of the resistor 43. The voltage $e_1$ is impressed across the terminals 34—35 and the voltage $e_2$ across the terminals 35—37. The sawtooth voltage $e_5$ having a wave form of linear negative slope is derived across the resistor 42.

With the rectified voltages $e_1$ and $e_2$ derived from a 60-cycle supply, a voltage $e_5$ of wave form, the negative slope branch of which is linear, was derived with components as follows in the branches of the circuit shown in Fig. 8.

| | |
|---|---|
| Inductance 38 | between 5 and 10 henries |
| Capacity 39 | between .33 and .66 mfds. |
| Resistance 41 | 10,000 ohms |
| Resistance 42 | 200 ohms |
| Resistance 43 | 10,000 ohms |

While, in accordance with the patent statutes, I have illustrated particular embodiments of my invention, it will be recognized by those skilled in the art that the principles thereof are of broad application in ways which will be evident to them.

I claim as my invention:

1. In combination with a source of sine wave voltage, a first full-wave rectifier supplied from said source, a second full-wave rectifier supplied with sine wave current of the same frequency as said source, but phase displaced relative thereto, a network having four terminals, an inductor shunted by a capacitor connected in series with a resistor between a first and a second of said terminals, a resistor connecting an intermediate point on said resistor with both the third and fourth of said terminals, means for connecting the output of the first-mentioned rectifier to the first and third of said terminals, and means for connecting the output of said second rectifier to the second and fourth of said terminals.

2. In combination with a feed-back oscillator, a first rectifier supplied with the output voltage of said oscillator, a second rectifier fed through a phase-displacing network with the output voltage of said oscillator, a network comprising four terminals, the first and third of said terminals being connected by a channel comprising an inductor shunted by a capacitor in series with a resistor, a resistor connecting an intermediate point on said resistor with the second and fourth of said terminals, and means for connecting the output terminals of said first rectifier across said first and second terminals and for connecting the output terminals of said second rectifier across the third and fourth terminals.

3. In combination with a source of sine wave voltage, a first full-wave rectifier supplied from said source, a second full-wave rectifier supplied with sine wave current of the same frequency as said source, but phase displaced relative thereto, a network having four terminals, an inductor shunted by a capacitor connected in series with a resistor between a first and a second of said terminals, a resistor connecting an intermediate point on said resistor with both the third and fourth of said terminals, means for connecting the output of the first-mentioned rectifier to the first and third of said terminals, and means for connecting the output of said second rectifier to the second and fourth of said terminals.

4. In combination with a feed-back oscillator, a first rectifier supplied with the output voltage of said oscillator, a second rectifier fed through a phase-displacing network with the output voltage of said oscillator, a network comprising four terminals, the first and third of said terminals being connected by a channel comprising an inductor shunted by a capacitor in series with a resistor, a resistor connecting an intermediate point on said resistor with the second and fourth of said terminals, and means for connecting the output terminals of said first rectifier across said first and second terminals and for connecting the output terminals of said second rectifier across the third and fourth terminals.

REUBEN LEE.

No references cited.